United States Patent [19]
Kah, Jr.

[11] Patent Number: 5,645,264
[45] Date of Patent: Jul. 8, 1997

[54] TILTED SEAT DIAPHRAGM VALVE

[76] Inventor: Carl L. C. Kah, Jr., 778 Lakeside Dr., N. Palm Beach, Fla. 33408

[21] Appl. No.: 279,326

[22] Filed: Jul. 22, 1994

[51] Int. Cl.$^6$ .................... F16K 31/385; F16K 31/126
[52] U.S. Cl. .................... 251/30.02; 251/45; 251/118; 251/126
[58] Field of Search .............. 251/30.02, 30.05, 251/45, 46, 118, 120, 126, 127; 138/45, 46, 42

[56] References Cited

U.S. PATENT DOCUMENTS

| | | | |
|---|---|---|---|
| 2,936,780 | 5/1960 | Pratt | 251/45 |
| 2,953,248 | 9/1960 | Troland | 138/45 |
| 3,103,338 | 9/1963 | Marmo | 251/45 |
| 3,379,406 | 4/1968 | Greer | 251/45 |
| 3,476,353 | 11/1969 | Stampfli | 251/45 |
| 3,544,062 | 12/1970 | Murray | 251/45 |
| 3,666,235 | 5/1972 | Scott | 251/118 |
| 4,301,992 | 11/1981 | Karbo | 251/46 |
| 4,336,918 | 6/1982 | Karbo | 251/46 |
| 4,477,051 | 10/1984 | Ben-Yehuda | 251/45 |
| 5,269,333 | 12/1993 | Richmond | 251/45 |

*Primary Examiner*—George L. Walton

[57] ABSTRACT

Flow control valve with round tilted valve seat and pivotally mounted matching spherical valve plug for leak tight shut off with generous Mfg tolerances and low pressure drop. Method shown for automatically limiting bleed flow during valve open and automatically restricting bleed flow at near valve close position to slow valve closing.

21 Claims, 5 Drawing Sheets

TILTED SEAT DIAPHRAGM VALVE

This invention relates to flow control valves used to control the flow of a fluid, such as water, in a conduit.

BACKGROUND

Flow control valves of the type having a liquid pressure actuated diaphragm to control opening and closing of a valve are known. Said control valves can be of the pilot valve operated type or be manually operated.

Background flow control valve patents are U.S. Pat. Nos. 3,439,895; 4,301,992; 4,336,918; and 4,508,136. These patents in turn refer to other patents and valve assemblies.

SUMMARY OF INVENTION

This invention provides a valve unique for its simplicity and enhanced lower pressure drop through the valve. This is accomplished by the use of a one piece molded diaphragm with a tilted seat valve plug and thicker cylindrical portion connecting the tilted seat valve plug and diaphragm plane of action. The center of the diaphragm valve plug is shifted to one side of center so that the diaphragm area is wider on the side of the diaphragm which has the greatest travel. The valve's reduced pressure drop is achieved by the smoother converging and then diverging flow path through the valve the necessity to converge being caused by the tilted seat and the need to limit the travel of the diaphragm for its size.

The flow area through the valve is converged with sloped areas to funnel the flow more easily through the valve seat area and then sloped divergently back to the full line size, thus providing minimized flow turbulence and recovering most of the velocity pressure. This arrangement provides a very low pressure drop for the valve size.

A new concept is disclosed to provide a simple self-cleaning method for increasing the restriction of the bleed flow during the time that the valve is fully open to reduce the tendency for clogging the bleed from dirty water contaminants. This is an important concept since the amount of flow that flows through the bleed to fill the valve control area above the diaphragm and move the diaphragm closed is a very small amount of water and has no real significance for clogging the bleed filter. The bleed flow stops flowing completely once the pilot valve is closed and the relatively small control volume above the diaphragm is completely filled. Bleed filter clogging is normally the result of the long continuous bleed flowing when the valve is signaled open by the pilot valve being opened which dumps flow continuously during the entire time the valve is signaled open by the open dumping pilot valve.

Another new concept is disclosed to provide a simple self-cleaning method for restricting the bleed flow to slow the valve's closing just prior to the valve becoming fully closed while allowing the normal bleed flow during most of the closing so that the valve does not exhibit excessively long closing times.

Still another concept is disclosed for configuring the bleed flow port so that it will self-limit or reduce the bleed flow when the pressure difference across the diaphragm is increased.

The primary object of this invention is to provide a simple, low cost control valve with low pressure drop for its size and connecting pipe size.

Another object of the invention is to provide a valve with a spherically shaped valve plug and matching round valve seat to achieve a fluid tight sealing shut off with easily achieved manufacturing tolerances for a tilted seat through flow valve configuration.

Still another object of the invention is to disclose a feasible single-piece configuration for a tilted seat valve plug diaphragm with a thicker cylindrical connecting portion to match the diaphragm plane of action to the tilted seat valve plug and an elastomeric tongue and hinge to give the diaphragm pivotal stability.

A further object is to show a self-cleaning bleed passage integrally molded into the diaphragm bleed.

Another object of the invention is to show a simple manually actuated bleed configuration which can be used with most of the irrigation industry's standard replacement solenoids; no extra parts are required from what is normally required just for attaching the solenoid to the valve housing.

Another object of the invention is to provide a concept for reducing the closing bleed flow at the nearly closed position of the valve to slow the final closing of the valve for a soft no-noise shut off; reduced water hammer.

Another object of the invention is to provide a concept for reducing bleed flow when the valve is fully open to reduce the clogging of the bleed and filter element.

Still a further object is to show the concept of providing control ribs at the valve inlet and outlet to control swirl through the valve to reduce pressure loss.

Another object of the invention is to provide a simple self-limiting bleed flow passage configuration which automatically self limits or reduces the bleed flow as the pressure difference across the diaphragm and bleed flow area increases.

BEST MODE FOR CARRYING OUT THE INVENTION

Figure 1:
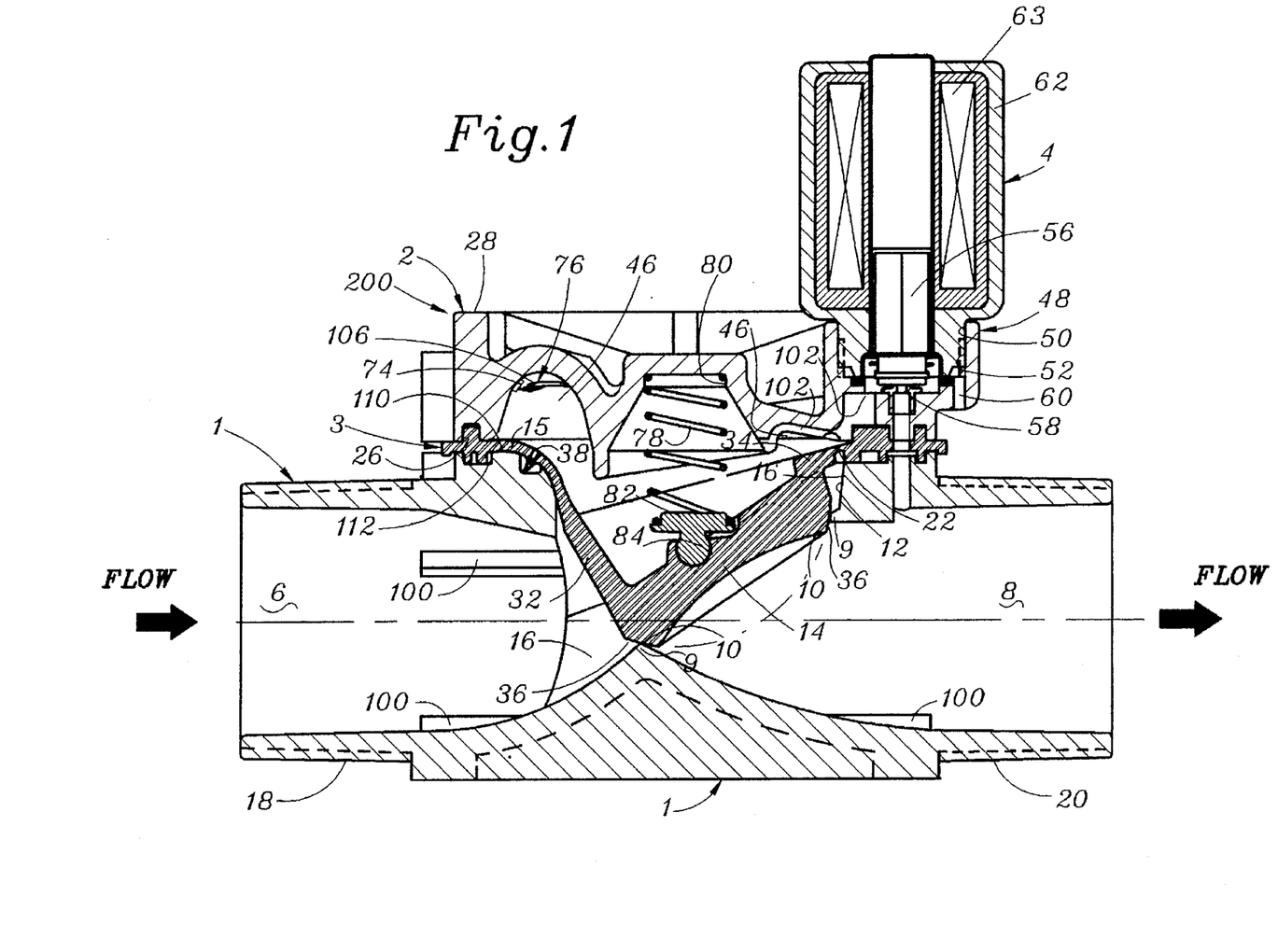
FIG. 1 is a sectional side view of a tilted seat diaphragm actuated control valve shown in the valve closed position.

A tilted seat, low pressure drop, flow control valve configuration 200, consisting of 4 main parts, is shown in FIG. 1 in the valve closed position:

(1) main valve body 1
(2) valve top cover 2
(3) diaphragm 3 with integral tilted seat
(4) solenoid operated pilot valve means 4

The main valve body 1 has an inlet 6 and a coaxial outlet 8, separated by a partition 9 with a valve opening 10 communicating between the inlet 6 and outlet 8 of the valve body 1. An opening 12 at the upper side above the axis of flow through the valve body 1 is sized to receive the diaphragm 3 and its integral tilted seat valve plug 14 and to provide sufficient diaphragm pressure area and diaphragm fold length 15 to accommodate the required valve plug 14 opening movement.

This main valve body 1 has no separate diaphragm support means as the opening 12 (see FIGS. 1,2, and 3) is sized only sufficiently large enough to accommodate the valve plug 14 with allowances for dirt clearances. The valve opening 10 through the partition 9 between the housing inlet 6 and outlet 8 is made round, (circular) even though it is placed at a tilted angle to the axis of flow. This valve opening 10 provides a round seating surface 11 to receive a spherical shape 36 of the closing surface of valve plug 14 which is molded as an integral part of the diaphragm 3 to be described later.

The side walls of opening 12 of valve body 1 are sloped at 16 towards the valve opening 10 to smoothly channel flow through the valve body 1 with minimum turbulence.

Flow straightening or swirl control vanes 100 are provided in the valve body inlet 6 and valve body outlet 8. The control of flow swirl through the valve is important to pressure loss reduction through the valve.

Attachment to the inlet 6 and outlet 8 of valve body 1 is made at 18 and 20 respectively with male exterior pipe threads integrally molded onto the valve body 1 for a minimum material, best strength configuration for pipe attachment to the valve body 1.

Figure 2:
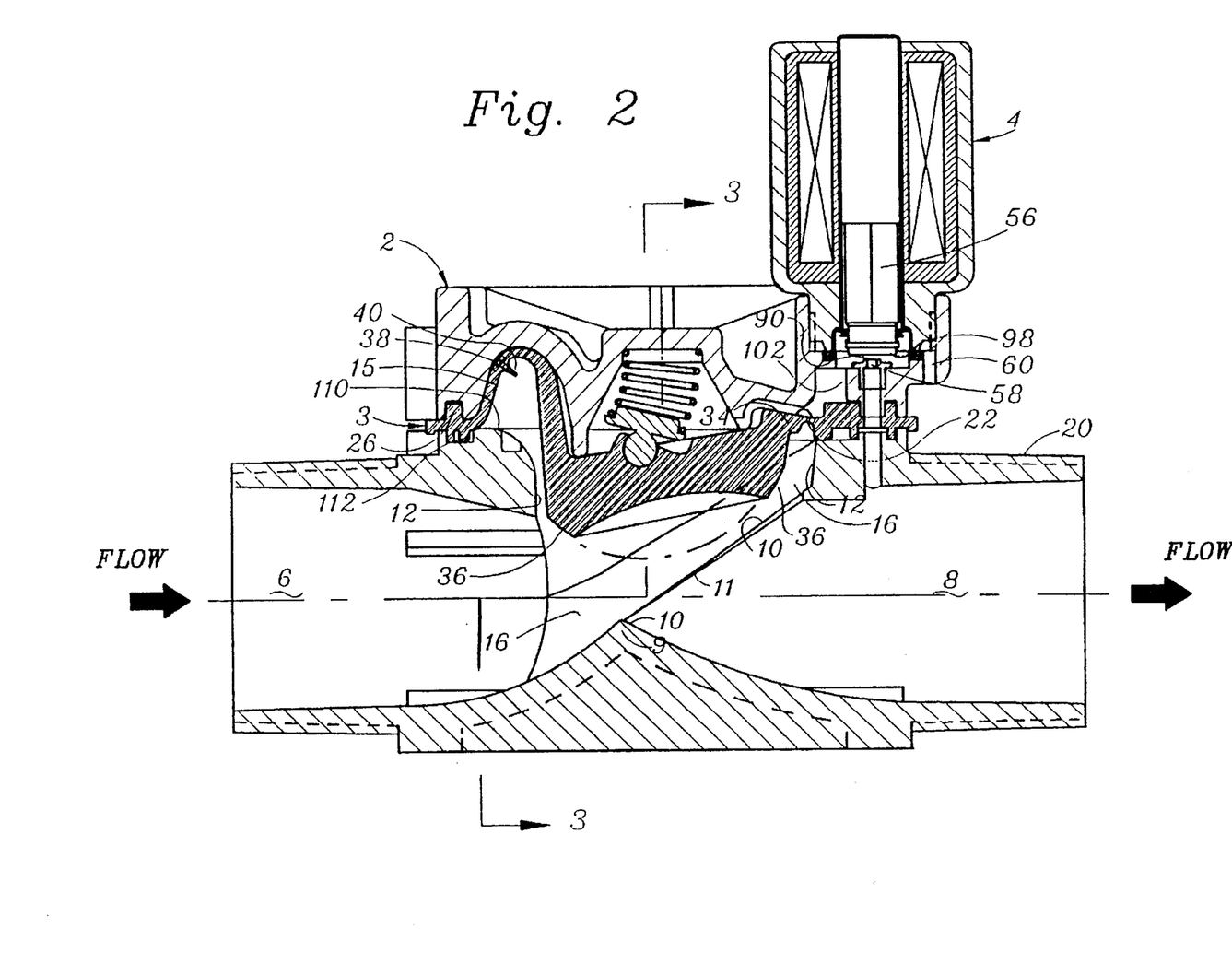
FIG. 2 is a sectional side view of the same tilted seat diaphragm actuated control valve of FIG. 1 shown in the valve open position.
Figure 3:
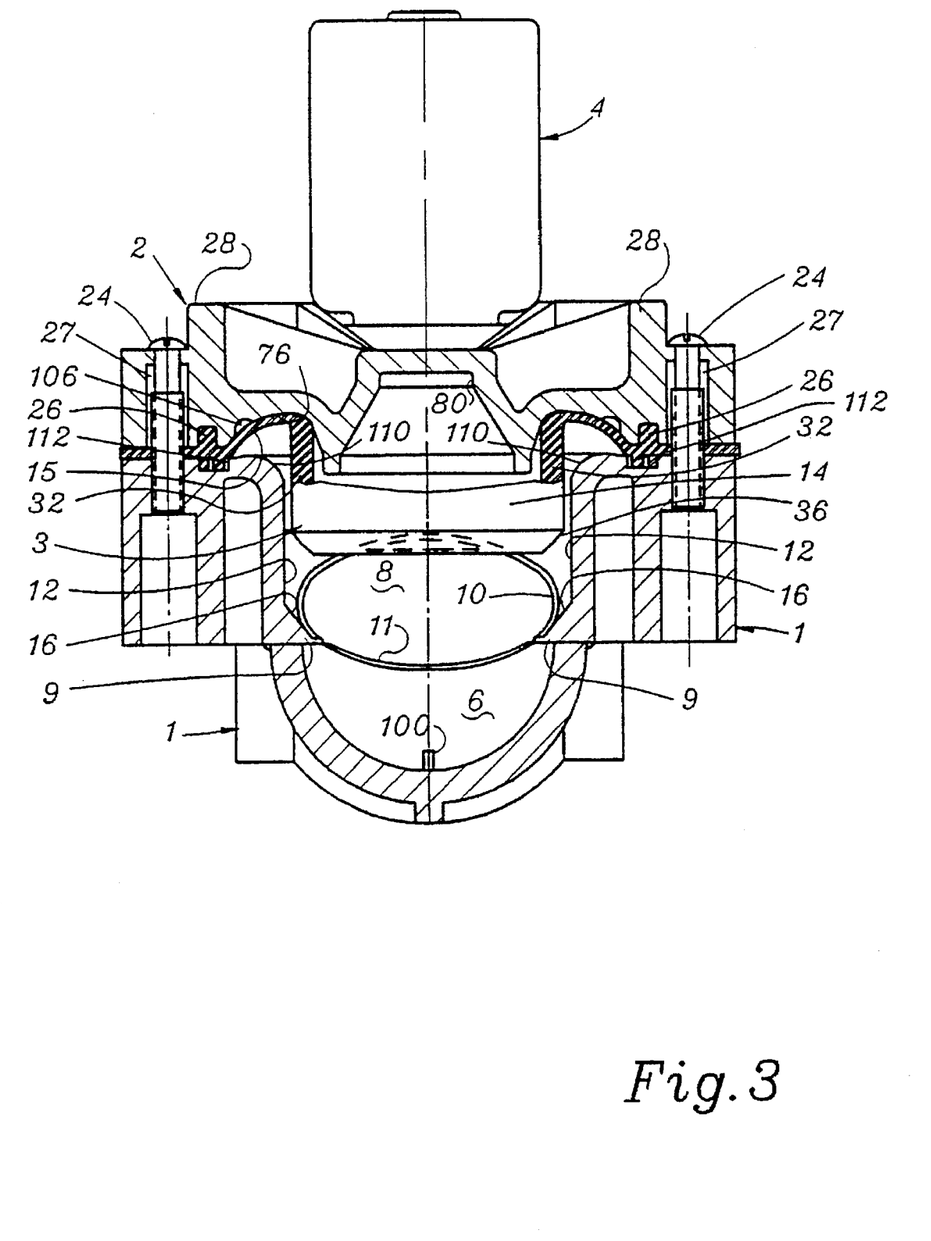
FIG. 3 is a cross sectional view of the valve taken on the line 3—3 of FIG. 2 looking into the valve housing along the axis of flow.

The valve top cover 2 has a circular closure relationship with the opening 12 of the valve body 1 and has a recessed volume area, or control chamber, 46 above the diaphragm 3 to receive the diaphragm fold length 15, cylindrical portion 32, and a portion of the valve plug 14 when the diaphragm 3 and its plug 14 are in the valve open position as shown in FIG. 2. There is also a connecting venting groove 106 and a recess 108 (FIG. 4) to receive a thicker tongue 34 of the diaphragm 3 to be later described.

A spring 78.(FIGS. 1, 2) is provided to act between the valve top cover 2 and the valve plug 14 of diaphragm 3 to bias the valve plug 14 toward the valve closed position.

The spring 78 is retained in position in the valve top cover 2 by a recess 80 and is held in a desired alignment with the top side of tilted seat valve plug 14 by a pivotally mounted spring retainer end piece 82 which is snap-fitted into a socket 84 in the back side of the tilted seat valve plug 14 to allow for the spring end to self-adjust to the varying angle as the valving member moves between its closed and open positions. This spring bias of the valve plug 14 toward the closed position insures that the valve will close under all flow conditions. The spring bias insures that at least a small pressure differential is produced across the diaphragm so that a bleed flow will tend to flow from the inlet 6 pressure side of the valve housing and diaphragm 3 to the control side of the diaphragm to fill the recessed volume area, or control chamber, 46 above the diaphragm 3 and cause the valve to close or at least start to close. This action will be here-in-after described.

Figure 4:
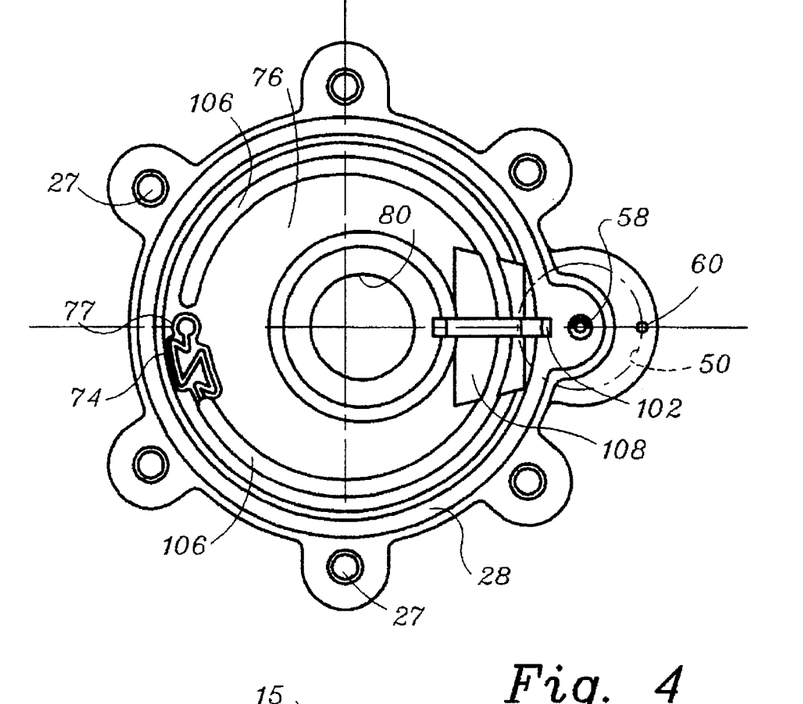
FIG. 4 shows the details of a valve open bleed flow restriction in the valve top cover recessed volume area or control chamber for reducing the tendency to clog the bleed while the pilot valve port is signaled open.

The inside surface 76 of the valve top cover 2 recessed volume area, or control chamber, 46 has labyrinth bleed flow passage restrictions 74 molded onto the inside surface 76 of the valve top cover 2 as shown in FIG. 4 to coact with the diaphragm 3 at the bleed hole area 38. These passages are 0.015–0.030 wide and 0.015–0.030 deep and follow a zigzag path to the venting groove 106 to provide a significant flow restriction for a bleed flow to enter the recessed volume area, or control chamber, 46 of the top cover 2. This action will later be described in more detail.

At one side of the valve top cover 2 there is formed a pilot valve mounting boss 48 having a cylindrical recess 50 therein. The cylindrical recess 50 is threaded at 52 to receive and attach a threaded solenoid operated pilot valve means 4. The solenoid coil housing 62 has an armature 56 therein for opening and closing a pilot valve port 58 whose operation will be later described. The pilot valve port 58 area in the valve cover 2 is connected to communicate with the recessed volume area, or control chamber, 46 in the valve top cover 2 by passage 102.

Figure 6:
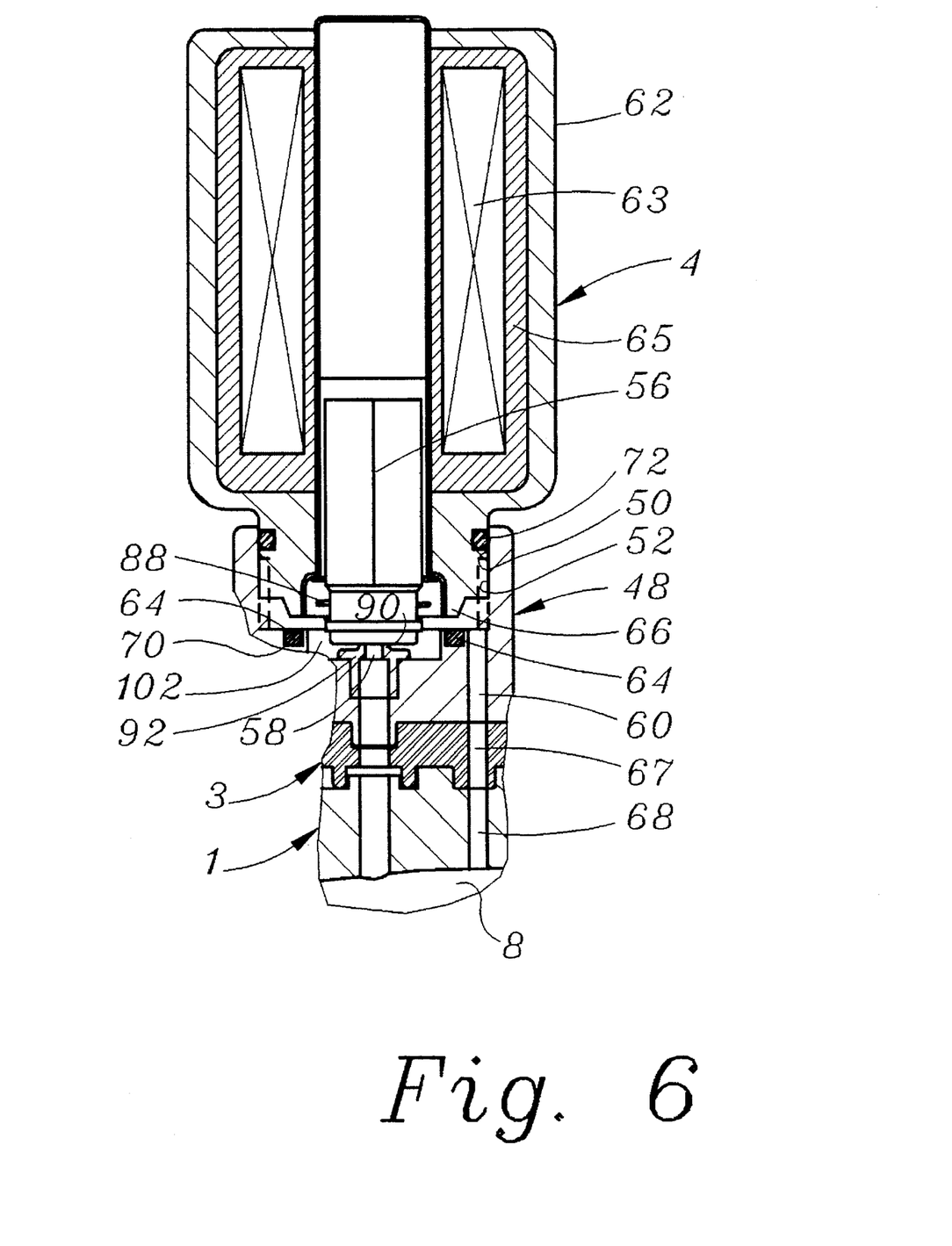
FIG. 6 shows an alternate manual bleed configuration where the bleed flow from manual operation is put back into the valve outlet and not dumped over board.

The valve top cover 2 provides for a simple manual bleed concept which can either dump overboard through hole 60 as shown in FIG. 1 for visual observation of valve bleed flow during manual operation, or the manual dump bleed hole 60 may be connected as shown in FIG. 6 to dump the manually initiated bleed flow back into the valve body outlet passage 8 through a connecting hole 67 in diaphragm 3 and a connecting hole 68 in outlet passage 8 so that no flow is dumped overboard. Operation of this feature to be described later.

The valve diaphragm 3 has an integrally molded valve plug 14 which is at a tilted angle to the plane of action of the valve diaphragm 3 and its circular center is displaced from the center of the diaphragm outside circumference 26. The diaphragm fold length 15 is connected to the tilted position valve plug 14 by a cylindrical heavier walled section 32 whose height varies around its circumference from the tilted valve plug 14 to the diaphragm fold length 15 and is blended to a thicker portion of the tongue 34 of the diaphragm 3. The tongue 34 has an integral hinge 22 formed in the diaphragm 3 which acts as a rotational pivot for the tilted valve plug 14 to rotationally move about to open and close the valve 200. The valve diaphragm 3 can be formed of an elastomeric material.

The surface 110 connects the body 1 opening 12 to the groove 112 receiving flange means on the outside circumference 26 of the diaphragm 3. It is contoured to match the diaphragm 3 fold 15 with the valve plug 14 in the closed position of the valve 200. This valve body surface 110 would serve as a diaphragm 15 back up surface to hold the diaphragm in proper position without a separate diaphragm support being needed.

The pivotal movement of the valve plug 14 about the hinge 22 moves the valve plug 14 between a closed position as shown in FIG. 1 in which the valve plug 14 of the diaphragm 3 engages the round valve seat 11 to block the flow of fluid through the valve inlet passage 6 to the valve outlet passage 8, and to an open position in which the valve plug 14 is spaced from the round valve seat 11 as shown in FIG. 2 to allow the flow of fluid through the valve opening 10 from the inlet 6 to the outlet 8.

The valve plug 14 is molded with a spherical shaped radius around its outside plug circumference at 36 which allows it good self-centering and sealing characteristics with the round valve seat 11 of opening 10 of valve body 1 for a leak tight 360 degree seal in the closed position of the valve even with normal manufacturing molding tolerances.

The valve top cover 2 is attached by screws 24 at multiple locations 27 around the cover closure flange 28 of top cover 2. The diaphragm 3 is sandwiched between the valve body 1 and the top cover 2 to form a seal between these two members around the circumference at 26. The diaphragm 3 extends across the opening 12 in the valve body 1 above the opening 12 to define the control chamber 46 in the valve top cover 2 on one side of the diaphragm 3 with the other side of the diaphragm 3 communicating with the inlet flow passage 6 of the valve body 1 through valve body opening 12.

Another unique feature of the valve diaphragm 3 is integrally molded-in bleed hole 38 which has thin opening covering lips 40 which are, for example, 0.015 to 0.020 inches thick and spaced apart by approximately 0.015 inches forming a thin slot flow area 42 (see FIG. 5) between them to the bleed hole 38 on the upstream inlet side to provide a self-cleaning filter feature for the small bleed hole 38 which is typically 0.030 inches in diameter.

Figure 5:
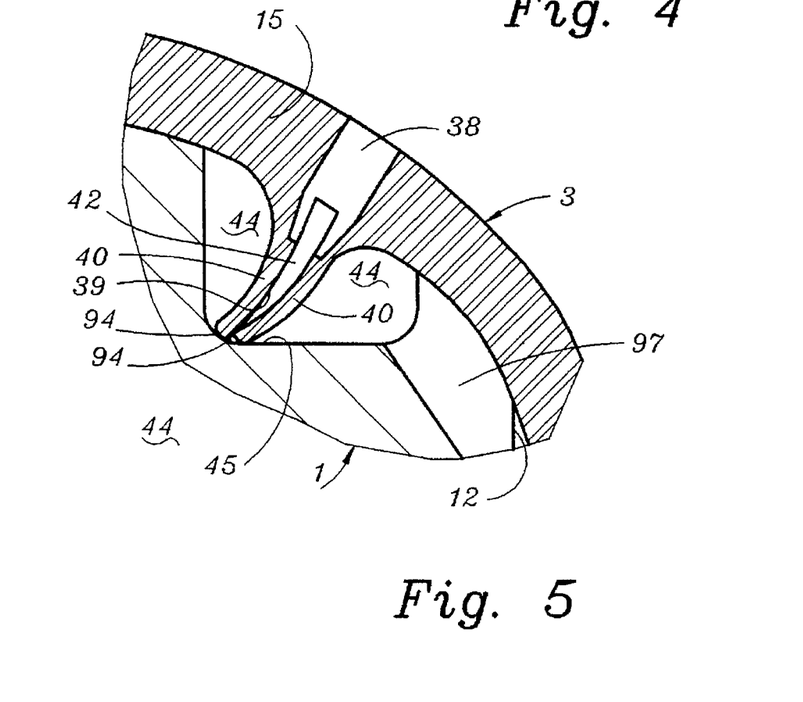
FIG. 5 shows an enlarged view of the valve closed bleed flow reduction configuration for slowing the final closing of the valve.

These thin lips 40 can be designed to provide bleed flow limiting as the pressure difference across the diaphragm increases. The thickness, height, and length of the lips 40 can be varied as well as the hardness of the elastomeric material.

This bleed flow limiting will occur automatically due to the pressure difference pressuring the thin lips 40 covering the bleed hole 38 inwardly toward each other and closing down on the thin slot flow area 42 between them to the bleed hole 38 in the diaphragm 3. The lip surfaces 39 that form slot 42 between them can be provided with ribs 0.010 inches high, for example, to prevent the slot from being closed off completely.

These thin lips 40 may also be bent by a surface 45 in a small recess 44 placed in valve body 1 to receive the lips 40. The recess 44 is connected to opening 12 in the valve body 1 by passage 97. The point of contact being selected during design to control the rate of valve final closing FIGS. 1 and 5. This action is to reduce the bleed flow at this time and slow the final valve closure for reduced inlet line pressure disturbance such as hammering at final closing.

A solenoid 5 is attached to valve top cover 2 in the pilot valve mounting boss 48. This solenoid 5 consists of an electrical coil 63 and an iron flux path assembly 65 in a solenoid housing 62 along with an armature 56.

The solenoid armature 56 has a rubber seating plug 98 for its pilot valve end to contact pilot valve port 58 for a sealing shut off when the solenoid electrical coil is not energized. When a source of electricity is connected to the solenoid electrical coil 63, the armature 56 is moved upwardly against spring 88, removing the rubber seating plug 98 from the seat 90 of the pilot valve port 58.

An "O" ring seal retention groove 70 is provided in the bottom of the cylindrical recess 50 of the valve top 2 to hold a seal 64. This seal 64 allows the solenoid housing 62 circular sealing lip 66 to act against the retained "O" ring 64 to provide a leak tight shut off to dump hole 60. To manually operate the flow control valve 200, (1) the solenoid housing 62 is manually turned to partially unscrew the solenoid housing 62 unseating circular sealing lip 66 from against "O" ring 64, allowing flow to the manual bleed flow dump hole 60. This action can thus open a low pressure area to the recessed area volume, or control chamber, 46 above the diaphragm 3 through connecting passage 102 dumping the pressure in this area 46 and thus manually causing main flow through the valve body 1 to be turned on; (2) when the solenoid housing 62 is turned in a thread-tightening direction, the circular sealing lip 66 is again pressed against housing "O" ring 64 shutting off flow to dump hole 60. The bleed flow through filter lips 40 and bleed hole 38 from the valve inlet 6, again fills the recessed area volume, or control chamber, 46 above the diaphragm 3 with high pressure fluid causing the flow control valve, 200 to be closed.

The simplicity and reduced number of parts provides manufacturing economy, and ease of assembly and future maintenance.

A second "O" ring 72 should be added between the solenoid housing 62 and the valve top cylindrical recess 50 to prevent overboard leakage if the bleed flow is being dumped back into the valve outlet 8 as shown in FIG. 6.

The flow through the flow control valve configuration 200 shown in FIGS. 1 and 2 is from left to right with the diaphragm 3 closing in the direction of flow. This flow direction provides several advantages in that the flow control valve 200 wants to be in, or move to, a closed position if a diaphragm failure in service should occur. The pressure is the same on both sides of the diaphragm area when the flow control valve 200 is closed. Thus no diaphragm back-up support is required in the closed position of flow control valve 200 and the long term stresses on the diaphragm are minimized.

The tilted round valve seat and matching spherical valve plug which provides leak tight sealing without exact angular matching of valve plug to seat is also applicable to control valves which have flow in the other direction with the valve plug closings into the flow.

The application of a round seat and matching self-aligning spherical valve plug with the concept of tilting a round valve seat to receive the flow with sloped surfaces to funnel the flow through the valve seat area in combination with minimizing the enlargement of the valve body in the area of the valve plug to reduce pressure loss through the valve is an important concept of this invention. Combining these concepts of this invention provides a smaller, lower pressure-drop valve which is easier to manufacture. Sudden changes in flow direction and flow path area have been eliminated and a leak tight shut off with generous manufacturing tolerance allowances are the benefits.

By pressurizing the control chamber 46, the pressure across the diaphragm 3 moves tilted seat valve plug 14 to the valve closed position shown in FIG. 1. As the valve plug 14 begins to close the valve opening 10 in the valve body 1 between the inlet 6 and the outlet 8, the pressure difference above the area of the valve plug 14 of the diaphragm further aids in moving the valve plug 14 toward the valve outlet opening 10 and when closed, to press the valve plug 14 into the round seat 11 of the valve body 1 for a leak tight 360-degree sealing shut off around the spherical surface 36 of the valve plug 14. The spherical surface 36 of the valve plug 14 providing leak tight shut off at varying angles of valve plug 14 to valve seat 11 closure.

By reducing the pressure in the control chamber 46, the pressure under the diaphragm fold length 15 generates an upward force on the diaphragm fold length 15 around the circumference of the tilted seat valve plug 14 and reduces the pressure on top of the valve plug 14 until the upward force around the outside circumference exerted by the diaphragm fold length 15 on the valve plug 14 lifts the valve 14 plug off of the round valve seat 11 and moves it to the open position shown in FIG. 2 against the spring force of biasing spring 78.

Although the pressure in the recessed volume area, or control chamber, 46 can be controlled in different ways, in the embodiment illustrated, the control chamber 46 is provided with pressurized fluid from the valve inlet 6 through bleed hole 38 which is integrally molded into the diaphragm fold length 15 (FIGS. 1 and 2). As shown, this bleed flow hole 38 communicates with the control chamber 46 above the diaphragm.

To cause the valve plug 14 to be moved to the open position, as shown in. FIG. 2, the pressure in the control chamber 46 must be reduced below that which is below the diaphragm. In normal operation, to open the flow control valve 200, the solenoid coil 63 is energized to retract the solenoid armature 56 against the force of its seating spring 88 and moves the armature 56 off of the valve seat 90 to open the opening 58.

A pilot valve seat insert 92 provides valve seat 90 and has an opening 58 which is normally about 0.050 inches in diameter providing a control chamber 46 venting capability over the area of the bleed hole 38, which is normally only about 0.030 inches in diameter, of 3:1.

When the solenoid 5 is energized the flow control valve 200 will be forced open by the high pressure in the valve body 1 in opening 12 on the under side of the diaphragm and the now reduced pressure on the upper side of the diaphragm fold length moves the diaphragm 3 and its valve plug 14 upward to open the valve opening 10. The area around the bleed hole 38 in the diaphragm fold length 15 touches the inside of the recess surface 76 of the valve top cover 2. The bleed flow hole 38 would then be completely shut off except for the incorporation of a fluid resistor being created by labyrinth passages 74 which are created by ridges 77 on the inside surface 76 of the valve top cover 2. These ridges 77 form a labyrinth construction which creates a high resistance passage 74 as shown in FIG. 4 for the bleed flow into the recessed volume area, or control chamber, 46 above the diaphragm when the diaphragm fold length has been pressed against the inside surface 76 of the valve top cover 2 as shown in FIG. 2. This increased resistance for the bleed flow just at the time that the flow control valve 200 is fully open is important since the valve 200 will stay in this condition during the entire time that the valve 200 is signaled open by having the pilot valve port 58 open which dumps pressure off the top of the diaphragm 3 to keep the valve 200 open. In dirty water conditions, a continuous high bleed flow would cause dirt to accumulate at the entrance to the bleed hole 38, or slot 42 between thin lips 40 which would substantially reduce or stop, the bleed flow. This problem is lessened by reducing the bleed flow during this time.

An attractive feature of the unique way this additional restriction is provided is that it is self-cleaning and the flow control valve 200 is allowed to move closed at normal speed as soon as the pilot valve 58 port is closed and pressure begins to build back up above the diaphragm 3 which moves the diaphragm fold length 15 out of contact with the ridges 77 forming the passage 74 which had been restricting the bleed flow into control chamber 46 on the inside of the valve top cover surface 76 which had created the additional restriction of the bleed flow.

When the solenoid 5 is de-energized, the pressure in the recessed volume area, or control chamber, 46 above the diaphragm is restored by flow from the inlet side of the valve 200 through the bleed 38 into this area above the diaphragm 3. This begins to balance the pressure on both sides of the diaphragm 3 and the diaphragm begins to move down and the tilted valve plug 14 begins to close the valve opening 10 in partition 9 of the valve body 1. Also the pressure under the valve plug 14 becomes less and the biasing spring 78 acting between the valve top 2 and the top of the diaphragm 3 acts to move the valve plug 14 rotationally about the integral diaphragm hinge 22 to place the tilted seat valve plug 14 with its self-aligning spherical surface 36 into the round main flow valve seat 11 of opening 10 in the partition 9 of body 1. Locating the bleed out of the flow path of flow control valve 200 protects it from dirt coming down the line. This is a problem on valves in newly installed systems when the bleed hole 38 is typically placed in the valve flow path to be washed against to provide self-cleaning. This bleed configuration relies on the flexing between the lips 40, which are over the bleed hole 38 during the movement of the diaphragm 3 to dislodge dirt that may have temporarily lodged on the edges 94 of the flexible lips 40.

Although exemplary embodiments of the invention have been shown and described, many of the newly disclosed concepts can be applied to other configurations of diaphragm operated valves.

I claim:

1. A flow control valve for controlling the flow of fluid having a housing including a passage having an inlet and an outlet, a valving means obliquely disposed in said passage between the inlet and the outlet for controlling flow therebetween, said valving means comprising a valve seat obliquely disposed to the direction of flow and valve plug means complementary thereto for engaging said valve seat, said valve plug means made from a flexible material including a unitary formed hinge portion extending along a portion thereon and spaced from a peripheral portion thereof for rotating said valve plug means about said hinge portion for seating and unseating said valve plug means on and off of said valve seat, a pressure responsive means mounted in said housing adjacent said valving means, said pressure responsive means controlling the movement of the valve plug means, said valve plug means being moved between an open and closed position by pressure forces acting on opposite sides of said pressure responsive means, said valve seat being round, said valve plug means being spherically shaped where it contacts said round valve seat in its closed position to provide good self-centering and sealing characteristics as a function of said hinge portion.

2. A flow control valve as set forth in claim 1, wherein said pressure responsive means includes a diaphragm, said diaphragm being formed of an elastomeric material, and said valve plug means is integrally molded with said diaphragm and being offset relative to the center line of said diaphragm.

3. A flow control valve as set forth in claim 2 wherein said housing includes a main body and a cap removably mounted to said main body defining with said housing a cavity, said valve plug means and said diaphragm disposed in said cavity and said valve plug means is pivotally mounted relative to said valve seat, said flexible material being elastomeric, said diaphragm having an extension portion clamped between said cap and said main body and having an elastomeric hinge disposed between said extension portion and said valve plug means, said diaphragm having a working portion responsive to pressure whereby said working portion moves toward said cap causing said valve plug means to pivot about said elastomeric hinge.

4. A flow control valve as set forth in claim 1 wherein valve plug means engages said valve seat, said valve plug means being moved to a closed position in the direction of flow, said valve plug means being moved to an open position against the direction of flow.

5. A flow control valve as set forth in claim 1 wherein said pressure responsive means is fixedly attached to said valve plug means.

6. A flow control valve having a housing with an inlet and an outlet, a valving means between said inlet and said outlet for controlling flow therebetween, said valving means comprising a main flow passage opening through an obliquely disposed partition between said inlet and said outlet, said opening having a valve seat therearound, an oblique disposed valving plug means for engaging said valve seat and complementary thereto and closing said main flow passage opening in the direction of flow when in a control valve closed condition and said obliquely disposed valving plug means being withdrawn from said valve seat of said main flow passage opening against the direction of flow for controlling a valve open condition allowing flow through the control valve, pressure responsive means fixedly attached to said obliquely disposed valving plug means in a valve closed or valve open position, said pressure responsive means consisting of a diaphragm with said obliquely disposed valving plug means attached by a cylindrical section of varying height to match the obliquely disposed valving plug means to the plane of action of said pressure responsive diaphragm to move the obliquely disposed valving plug means between an open and closed position and said diaphragm being formed from a flexible material including a unitary hinge portion for rotating said valving plug means about said hinge portion extending along a portion thereon and spaced from a peripheral portion thereof.

7. A flow control valve as set forth in claim 6 wherein the center of said cylindrical section is shifted to one side of the center of said diaphragm to provide a wider diaphragm fold and greater pressure area on the other side of the diaphragm to provide for a greater travel of said valving plug on the side of the diaphragm with the wider fold; a hinge is placed on the shorter side of the diaphragm to provide for pivotal movement of the valve plug means; said diaphragm, tilted valving plug means, and hinge being formed as an integrally molded unit; said hinge being formed as a wider, thicker tongue portion.

8. A flow control valve as set forth in claim 6 wherein said flow passage opening is round, said valving plug means having a spherical shape to seal with said round flow passage opening.

9. A flow control valve as set forth in claim 6 wherein the valve housing walls are tapered toward said main flow passage opening in said partition means to funnel flow therethrough.

10. A flow control valve for controlling the flow of fluid having a housing comprising a main body and a cap removably affixed to said main body and defining therewith a cavity, an axially extending passage and an opening interconnecting said cavity and said passage, an inlet and outlet in said passage, valving means obliquely disposed in said passage between said inlet and outlet for controlling flow therebetween, said valving means comprising a valve seat and valve plug means, said valve plug means having a unitary formed hinge portion spaced from a peripheral edge thereof and extending into said cavity, said plug means including a lip affixed to said main body and said lip being on the peripheral edge of said valve plug, said valve plug means and said hinge portion made from a flexible material, a pressure responsive means mounted in said housing adjacent said valving means, said pressure responsive means controlling the movement of the valve plug means, said pressure responsive means being responsive to pressure in said cavity, and means to control said pressure responsive means to position said valve plug means relative to said valve seat for opening and closing said valving means, whereby said valve plug rotates about said hinge portion as a function of said opening and closing of said valving means.

11. A flow control valve as claimed in claim 10 wherein said pressure responsive means is a diaphragm, said diaphragm having a working portion and a annular outer edge, said annular outer edge being secured between said cap and said main body, said diaphragm being integrally formed with said valve plug means and said hinge portion, said diaphragm and said hinge portion and said valve plug means being made from an elastomeric material, and said working portion and said hinge portion and said valve plug means extending across said opening for defining with said cap a control chamber and said control means operatively connected to said control chamber for adjusting the pressure in said control chamber acting on said diaphragm.

12. A flow control valve as claimed in claim 11 wherein said fluid is water.

13. A flow control valve as claimed in 12 wherein said valve seat is circular and said plug means includes a truncated spherical surface for bearing against and extending in said valve seat for self-centering said valve plug when positioned in the closed position.

14. A flow control valve as claimed in claim 12 wherein said control means includes a bleed hole in said diaphragm and a labyrinth contoured passage formed in the inner surface of said cap adjacent to said control chamber to restrict the flow of bleed water when said working portion is positioned to abut the inner surface of said cap.

15. A control valve as claimed in claim 12 wherein said bleed hole includes fingers extending from said working portion away from said control chamber.

16. A control valve as claimed in claim 12 including flow straightening means disposed in said passage upstream of said valve plug means relative to the flow of water.

17. A control valve as claimed in claim 10 wherein said control means includes an electrically operated solenoid valve and said solenoid valve in fluid communication with said pressure responsive means to change the pressure therein and actuate said valve plug means.

18. A control valve as claimed in claim 17 wherein said solenoid valve includes an outer casing attached to said control valve and being adjustable to manually operate said control valve.

19. A control valve as claimed in claim 14 wherein the area of said bleed hole is variable to vary the flow from said control chamber so as to change the rate of change of closure of said valve plug means to prevent water hammer.

20. A flow control as claimed in claim 10 wherein said valve means includes vent means having a first vent passage and a second vent passage, a remote solenoid operated pilot valve and a manually operable valve, said solenoid operated pilot valve having a solenoid housing attached to said main body, a seal located between said solenoid housing and said main body, said solenoid operated pilot valve controlling said vent means to vent the control chamber to a first vent passage connected to a lower pressure location and said manually operable valve controlling said vent means to vent the control chamber to a second vent passage connected to a lower pressure location, said manually operable valve being manually actuated by moving said solenoid housing on said valve housing permitting flow by said seal to said second vent passage.

21. A flow control valve as claimed in claim 10 including valve opening and seat in a partition between said inlet and said outlet, a diaphragm extending across the area above said valve seat defining a control chamber on one side of the diaphragm communication with said valve housing, the other side of the diaphragm communicating with said main flow passage, means for providing communication between a location in the main flow passage upstream of said valve seat and said control chamber whereby the control chamber can be supplied with fluid under pressure from said valve inlet, valve plug means to coact with said valve seat in said housing to control flow through said housing from the inlet to the outlet, said diaphragm controlling the movement of said valve plug means, vent means for venting said control chamber to a lower pressure location, valve means in said vent means for controlling the flow of fluid from said control chamber to said lower pressure location, said means for providing communication between a location in the main flow passage upstream of said valve seat and said control chamber whereby the control chamber can be supplied with fluid under pressure from said valve inlet being a small hole in the diaphragm, said small hole having lips extending therefrom to form a thin slot at the entrance to said hole, said lips being moved relative to each other by the flexing of the diaphragm as the diaphragm moves between valve open and valve closed position to dislodge dirt particles that may have accumulated on the edges during operation.

* * * * *